(12) United States Patent
Karnik

(10) Patent No.: US 12,494,953 B1
(45) Date of Patent: Dec. 9, 2025

(54) INTERFACE CIRCUIT ALLOWING DIFFERENTIAL AND NON-DIFFERENTIAL SIGNALING ON ONE BUS

(71) Applicant: Endress+Hauser SE+Co. KG, Maulburg (DE)

(72) Inventor: Gautham Karnik, Whitestown, IN (US)

(73) Assignee: Endress+Hauser SE+Co. KG, Maulburg (DE)

( * ) Notice: Subject to any disclaimer, the term of this patent is extended or adjusted under 35 U.S.C. 154(b) by 1 day.

(21) Appl. No.: 18/816,121

(22) Filed: Aug. 27, 2024

(51) Int. Cl.
*H04L 25/08* (2006.01)
*H03K 19/20* (2006.01)

(52) U.S. Cl.
CPC ............ *H04L 25/085* (2013.01); *H03K 19/20* (2013.01)

(58) Field of Classification Search
CPC .............................. H04L 25/085; H03K 19/20
See application file for complete search history.

(56) References Cited

U.S. PATENT DOCUMENTS

| | | | |
|---|---|---|---|
| 8,116,240 B2* | 2/2012 | Kim ...................... | H04L 25/085 370/284 |
| 9,620,051 B2* | 4/2017 | Shi ........................ | G09G 3/2096 |
| 10,097,032 B2* | 10/2018 | Hu ....................... | H02J 7/00038 |
| 10,554,456 B2* | 2/2020 | Rehman .............. | H04L 27/2071 |

* cited by examiner

*Primary Examiner* — Dac V Ha
(74) *Attorney, Agent, or Firm* — Mark A. Logan; Endress+Hauser (USA) Holding, Inc.

(57) ABSTRACT

An interface circuit enabling communication via a differential transceiver with both differential signaling and non-differential signaling field devices connected to the same bus includes switches and control logic to enable differential signaling on the bus in a first mode and non-differential signaling on the bus in a second mode. In the second mode of non-differential signaling, the differential conductors of the bus are held at the same potential. Further in the second mode of non-differential signaling, a differential signal is created within the interface circuit from one signal of the bus and provided to the differential transceiver.

8 Claims, 3 Drawing Sheets

INTERFACE CIRCUIT ALLOWING DIFFERENTIAL AND NON-DIFFERENTIAL SIGNALING ON ONE BUS

TECHNICAL FIELD

The present disclosure relates generally to an interface circuit for an RS-485 transceiver.

BACKGROUND

An industrial process automation system may include a central controller (for example, a programmable logic controller, PLC) and one or more field devices. Some of the field devices in the process automation system may measure something about the automated process such as, for example, a tank fill level, a mass flow through a pipe, or a temperature of a medium. Some of the field devices may control something about the process, such as, for example, a pump state (i.e., on/off), a valve state, or something similar. But all the field devices of the process automation system—regardless of their function—will be in communication with the central controller to measure and to manage the automated process.

The central controller and the various field devices may communicate with each other via a bus. This bus may include a two-conductor or four-conductor cable running from the central controller to the field devices. The bus may be a multi-drop bus that allows several field devices to be connected to that same bus, or the bus may be only a point-to-point bus that allows the connection of only two devices. Whether the bus is multi-drop or point-to-point, the devices on that bus (i.e., the central controller and any field devices) must use the same physical layer signaling and the same communication protocol so that all these devices may communicate with each other. If the devices on a bus share the same physical layer but not the same protocol, the devices at least will be able to connect to that same bus, but their communication to each other will be gibberish.

Some process automation systems—especially larger ones—may implement more than one type of bus. For example, some of the field devices in the process automation system may implement a first physical layer and a first communication protocol, and other field devices in that same process automation system may implement a second physical layer and a second communication protocol. In these process automation systems, there will be two (or more) complete and separate buses implementing different communication standards and there may be two or more process automation controllers.

A communication bus according to the RS-485 physical layer standard is well-known and well-used in the art. The RS-485 bus may use a four-conductor cable having one conductor for suppling power, one conductor for providing a ground, and the remaining two conductors for differential signaling. The RS-485 standard allows a multi-drop bus: multiple nodes may be connected with each of the four conductors of the bus. That is, on a single RS-485 compliant bus, multiple devices may be connected with the same power and ground conductors, and these devices may also be connected with the two differential signaling conductors.

A communication bus according to the Serial-Digital Interface Standard (SDI-12) is also well-known and well-used in the art. An SDI-12 bus may use a three conductor cable: one conductor for power, one for ground, and a single data line. Because of the different manners of data signaling on RS-485 (that uses two differential signals) and SDI-12 (that uses a single data line), the two buses cannot be accommodated on the same four-conductor cable. Therefore, a process automation system having both RS-485 devices and SDI-12 devices requires the running of at least two separate busses in the system: one for each of the bus types.

Therefore, there remains a need in process automation systems that use both RS-485 devices and SDI-12 devices to accommodate both device types on the same physical bus to reduce the material cost and the effort of maintaining two separate communication buses.

SUMMARY

A serial communication interface circuit comprises a first D+ terminal and a first D− terminal forming a first differential signal input/output (I/O); a second D+ terminal and a second D− terminal forming a second differential signal I/O; an input voltage (VCC) terminal and a ground (GND) terminal; a differential mode enable input; a transmit enable input; a first single-pole, single-throw (SPST) switch and a pull-up resistor, wherein the first SPST switch is configured to connect the second D+ terminal to the VCC terminal via the pull-up resistor when the first SPST switch is closed; a second SPST switch and a pull-down resistor, wherein the second SPST switch is configured to connect the second D− terminal to the GND terminal via the pull-down resistor when the second SPST switch is closed; a termination resistor configured to connect the second D+ terminal to the second D− terminal via the termination resistor; a third SPST switch connected in parallel with the termination resistor and configured to connect the second D+ terminal to the second D− terminal when the third SPST switch is closed; a fourth SPST switch configured to internally disconnect the first D+ terminal when the fourth SPST switch is open; a first inverter configured to invert a D− signal of the second D− terminal; a single-pole, double-throw (SPDT) switch configured to connect the first D+ terminal from the fourth SPST switch to either the second D+ terminal or to the inverted D− signal from the first inverter; and switch control logic configured to control the first, second, third, and fourth SPST switches and additionally the SPDT switch.

In an embodiment of the serial interface communication circuit, the switch control logic is configured to close the first, second, and fourth SPST switches and open the third SPST switch when the differential mode enable input is asserted, the switch control logic is further configured to switch the SPDT switch to connect the first D+ terminal from the closed fourth SPST switch to the second D+ terminal when the differential mode enable input is asserted, the switch control logic is further configured to open the first and second SPST switches and close the third SPST switch when the differential mode enable input is un-asserted, the switch control logic is further configured to open the fourth SPST switch when the when the differential mode enable input is un-asserted and the transmit enable input is asserted and to close the fourth SPST switch when the differential mode enable input is un-asserted and the transmit enable input is un-asserted, and wherein the switch control logic is further configured to switch the SPDT switch to connect an output of the first inverter to the fourth SPST switch when the when the differential mode enable input is un-asserted, whereby the inverted D− signal is provided to the first D+ terminal via the SPDT switch and the fourth SPST switch when the differential mode enable input is un-asserted and the transmit enable input is un-asserted.

In an embodiment of the serial interface communication circuit, the switch control logic includes: a second inverter configured to provide an inverted differential mode enable input to a control input of the third SPST switch; a third inverter configured to provide the inverted differential mode enable input to a control input of the SPDT switch; a NAND gate configured to NAND the inverted differential mode enable input with the transmit enable input and to provide a NAND result to a control input of the fourth SPST switch.

A data acquisition unit comprises a microcontroller including a receive data (RX) input, and transmit data (TX) output, a TX/nRX enable output, and a differential mode enable output; a differential transceiver including a received data output connected with the RX input of the microcontroller; a transmit data input connected with the TX output of the microcontroller; TX/nRX enable input connected with the TX/nRX enable output of the microcontroller; and a differential signal input/output (I/O) including a D+ terminal and a D− terminal; and a serial communication interface circuit according to an embodiment of the present disclosure. In the data acquisition unit, the first D+ terminal of the serial communication interface circuit is connected with the D+ terminal of the differential transceiver; the first D− terminal of the serial communication interface circuit is connected with the D− terminal of the differential transceiver; the differential mode enable input of the serial communication interface circuit is connected with the differential mode enable output of the microcontroller; and the transmit enable input of the serial communication interface circuit is connected with the TX/nRX enable output of the microcontroller.

In an embodiment of the data acquisition unit, the microcontroller is configured to transmit differential data via the differential transceiver by asserting the differential mode enable output, by asserting the TX/nRX enable output, and by sending the differential data via the TX output, the microcontroller is configured to receive the differential data via the differential transceiver by asserting the differential mode enable output, by un-asserting the TX/nRX enable output, and by receiving the differential data via the RX input, the microcontroller is configured to send non-differential serial data via the differential transceiver by un-asserting the differential mode enable output, by asserting the TX/nRX enable output, and by sending the non-differential serial data via the TX output, and the microcontroller is configured to receive the non-differential serial data via the differential transceiver by un-asserting the differential mode enable output, by un-asserting the TX/nRX enable output, and by receiving the non-differential serial data via the RX input.

A field device network comprises a data acquisition unit according to an embodiment of the present disclosure; a bus having a voltage supply (VCC) conductor, a ground (GND) conductor, a D+ conductor, and a D− conductor; a first field device having a differential I/O having an D+ terminal connected with the D+ conductor bus and a D− terminal connected with the D− conductor of the bus, a second field device having a non-differential serial I/O, wherein the non-differential serial I/O is connected with the D− conductor of the bus.

In an embodiment of the field device network the microcontroller is configured to transmit differential data to the first field device via the differential transceiver by asserting the differential mode enable output, by asserting the TX/nRX enable output, and by sending the differential data via the TX output, the microcontroller is configured to receive the differential data from the first field device via the differential transceiver by asserting the differential mode enable output, by un-asserting the TX/nRX enable output, and by receiving the differential data via the RX input, the microcontroller is configured to send non-differential serial data to the second field device via the differential transceiver by un-asserting the differential mode enable output, by asserting the TX/nRX enable output, and by sending the non-differential serial data via the TX output, and the microcontroller is configured to receive the non-differential serial data from the second field via the differential transceiver by un-asserting the differential mode enable output, by un-asserting the TX/nRX enable output, and by receiving the non-differential serial data via the RX input.

DETAILED DESCRIPTION

Figure 1:
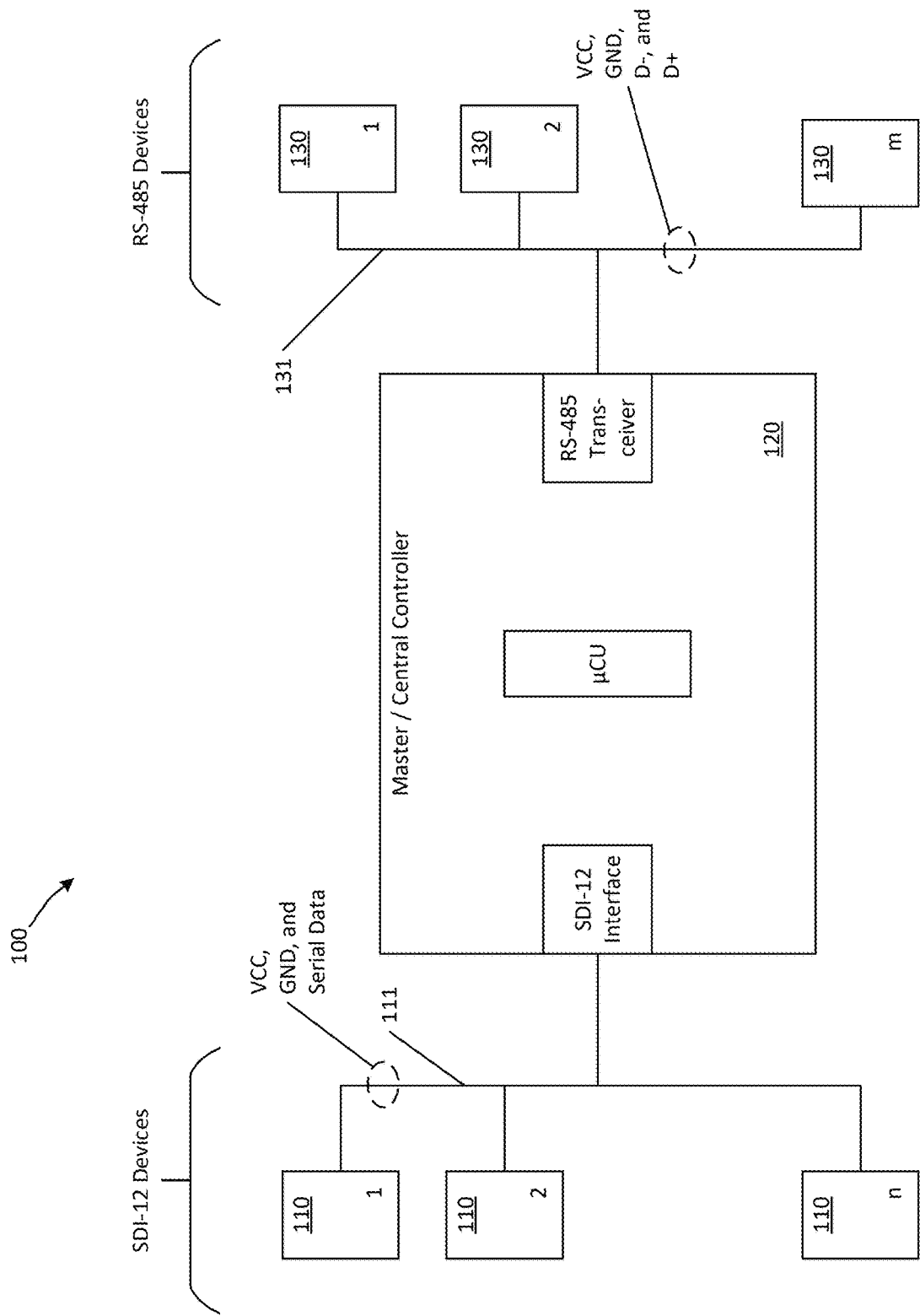
FIG. 1 shows a process automation system according to the state of the art.

FIG. 1 shows a typical process automation system 100 according to the state of the art. The process automation system 100 includes a central controller 120 having a microcontroller μCU (and associated memory, circuitry, etc.) and two or more communication interfaces. In the example as shown in FIG. 1, the central controller 120 includes an SDI-12 communication interface and an RS-485 communication interface.

The process automation system 100 as shown in FIG. 1 includes a plurality of field devices 110, 130 connected with the central controller 120. Some of the field devices 110 of the process automation system 100 may communicate according to SDI-12, and these are connected to the central controller 120 via the multi-drop, three-conductor SDI-12 bus 111. (Only three conductors are needed for SDI-12, but a four-conductor cable may be used for the convenience of having only one bus cable type in the process automation system 100.) Some of the field devices 130 of the process automation system 100 may communicate according to RS-485, and these are connected to the central controller 120 via the multi-drop, four-conductor RS-485 bus 131.

The process automation system 100 as shown in FIG. 1 therefore includes two electrically separate busses 111, 131, two electrically separate networks of field devices 110, 130, and a controller 120 having two separate communication interfaces, one for each of the field device networks.

Figure 2:
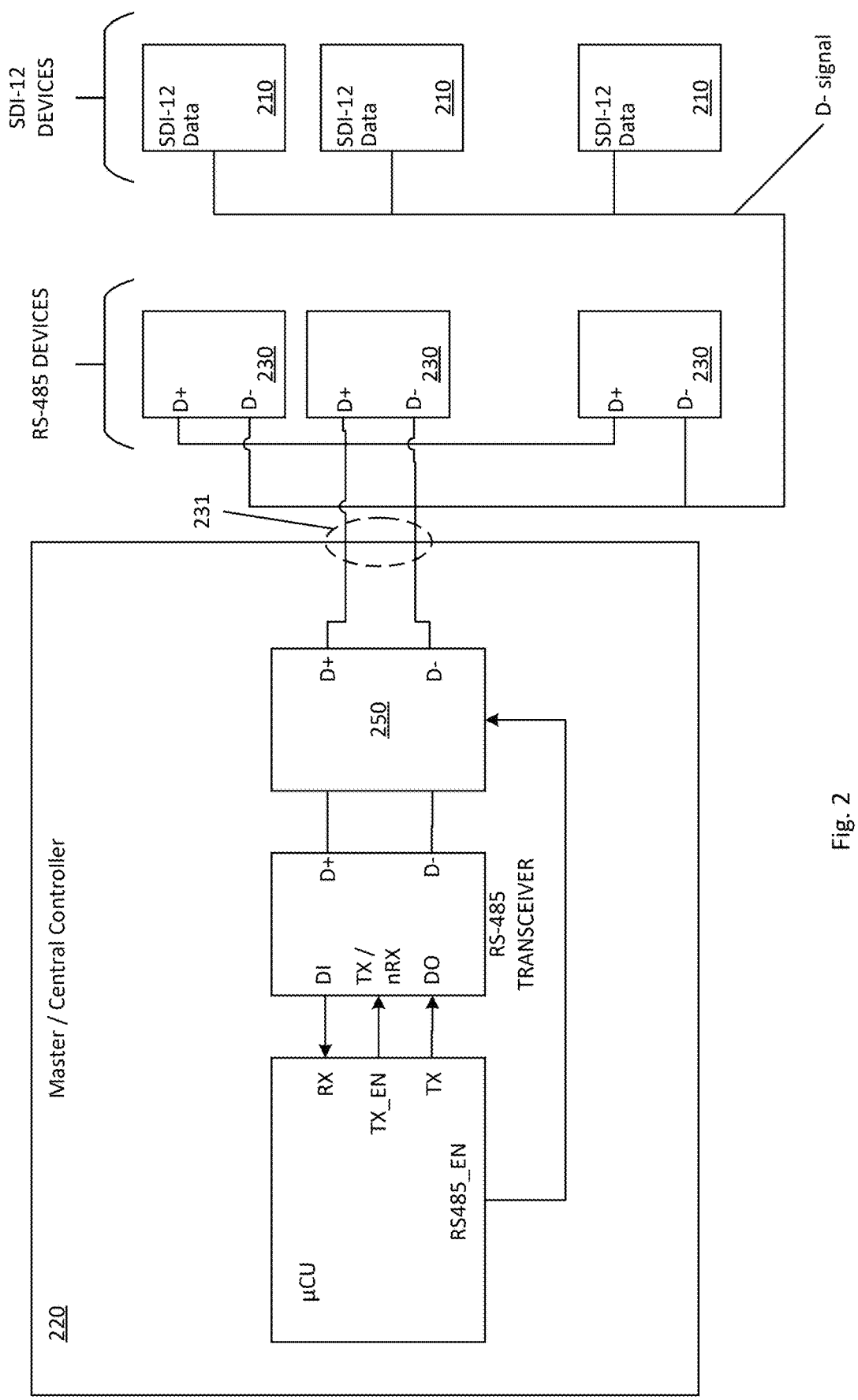
FIG. 2 shows a process automation system according to an embodiment of the present disclosure.

FIG. 2 shows a process automation system 200 according to an embodiment of the present disclosure. Like a process automation system 100 of the prior art, the process automation system 200 may include one or more RS-485 field devices 230 and one or more SDI-12 field devices 210. But in the process automation system 200 as shown in FIG. 2, both types of field devices 230, 210 are connected with the central controller 220 via a single, four-conductor, multi-drop bus 231. That is, both RS-485 and SDI-12 field devices may be accommodated on the same bus 231 according to the present disclosure.

The process automation system 200 may further include a central controller 220 having a microcontroller μCU (and associated memory and circuitry), an RS-485 transceiver, and an interface circuit 250. The central controller 220 need not also include an SDI-12 communication interface though there may be SDI-12 field devices in the process automation system 200; an SDI-12 communication interface circuit is not used in the context of the present disclosure.

The bus 231 as shown in FIG. 2 is represented by its differential data signals, D− and D+. Though the bus 231 may include conductors for power (VCC) and ground (GND), and these two conductors may be routed to each of the field devices 210, 230 (to provide VCC and GND to these field devices 210, 230), VCC and GND are not shown in FIG. 2 so that FIG. 2 is not unnecessarily complicated.

The differential signals D− and D+ of the bus 231 may be connected to the central controller 220 (in particular, to the RS-485 transceiver of the central controller 220) via the interface circuit 250. The VCC conductor of the bus 231 may be connected with a voltage driver circuit of the central controller 220, and similarly the GND conductor of the bus 231 may be connected with a common ground. However, as noted, neither VCC nor GND are shown in FIG. 2 because these signals are not germane to the novelty of the present disclosure.

In FIG. 2 and throughout the present disclosure, the RS-485 differential data signals have been labeled as D− and D+. However, these signals sometimes take different names in the various RS-485 literature. For example, the signal D− may be instead labeled as Tx−/Rx− or A or may be referenced as the non-inverting signal. Likewise, the signal D+ may be instead labeled as Tx+/Rx+ or B or may be referenced as the inverting signal.

The interface circuit 250 of the central controller 220 interfaces between, on one hand, the D− and D+ conductors of the bus 231 (to which both RS-485 field devices and SDI-12 field devices are connected) and, on the other hand, the D− and D+ terminals of the RS-485 transceiver. It is this interface circuit 250 that allows both types of field devices— RS-485 and SDI-12—to be connected with the same bus 231. Or stated in another manner, it is this interface circuit 250 that allows the RS-485 transceiver to communicate both with RS-485 field devices and SDI-12 field devices connected to the same bus 231.

As shown in FIG. 2, the interface circuit 250 may be connected with the two differential data terminals D−, D+ of the RS-485-transceiver, but additionally an enable signal RS485_EN may run from the microcontroller µCU to the interface circuit 250. An asserted enable signal RS485_EN indicates to the interface circuit 250 that the interface circuit 250 must operate in RS-485 mode; an un-asserted enable signal RS485_EN indicates to the interface circuit 250 that the interface circuit 250 must operate in SDI-12 mode.

The central controller 220 then will communicate in one of two modes: RS-485 or SDI-12. By enabling the RS-485 mode (by asserting RS485_EN) the microcontroller µCU causes the interface circuit 250 to use differential signaling on the D−, D+ lines. By enabling the SDI-12 mode (by not asserting the RS485_EN signal) the microcontroller µCU causes the interface circuit to communicate only on the D-line of the bus 231.

Note the enable signal RS485_EN passes around the RS-485 transceiver and is not connected with the RS-485 transceiver. No mode change occurs within the RS-485 transceiver (i.e., no mode change between RS-485 and SDI-12; there is of course a mode change between transmitting and receiving). The RS-485 transceiver thus always operates in RS-485 mode: communicating data serially with the microprocessor µCU via the DI/DO terminals and either driving or receiving differential signals D+/D− with the interface circuit 250. It is the interface circuit 250 that allows this differential signaling of the RS-485 transceiver to communicate only along the D− signal of the bus 231 when the central controller operates in SDI-12 mode.

When the central controller 220 communicates in RS-485 mode, whether the central controller 220 is transmitting or receiving, a differential signal will be present on the D− and D+ conductors of the bus. Though this differential signaling is between the central controller 220 and one or more RS-485 field devices 230, the SDI-12 field devices 210 will see that portion of the differential signal that is present on the D− conductor of the bus 231. If the bit rate of the D− signal is not 1200 bits per second (bps) as required by SDI-12 (See, "SDI-12 A Serial-Digital Interface Standard for Microprocessor-Based Sensors, Version 1.4, Jan. 30, 2021"), the SDI-12 field devices 210 will see just gibberish on the D− conductor and therefore will ignore the D− signal. Or similarly, if the protocol of that D− signal is not the SDI-12 protocol, the SDI-12 field devices 210 will ignore the D− signal. Therefore, by not using a communication rate of 1200 bps or by not using a protocol recognized by SDI-12, the RS-485 communication between the central controller 220 and one or more RS-485 field devices 230 along the bus 231 will not affect the SDI-12 field devices present on the same bus 231.

In contrast to RS-485 mode, when the central controller 220 communicates in SDI-12 mode, only the D− signal of the bus 231 is driven. The interface circuit has disconnected the D+ terminal of the RS-485 transceiver from the D+ conductor of the bus 231. No differential signal between D+ and D− is present on the bus 231. (In fact, the interface circuit 250 ties the D+ and D− conductors of the bus together so that the D+ and D− signals are at the same voltage levels.) Therefore, not detecting any differential signal, the RS-485 field devices 230 will ignore all SDI-12 communications on the bus 231.

Figure 3:
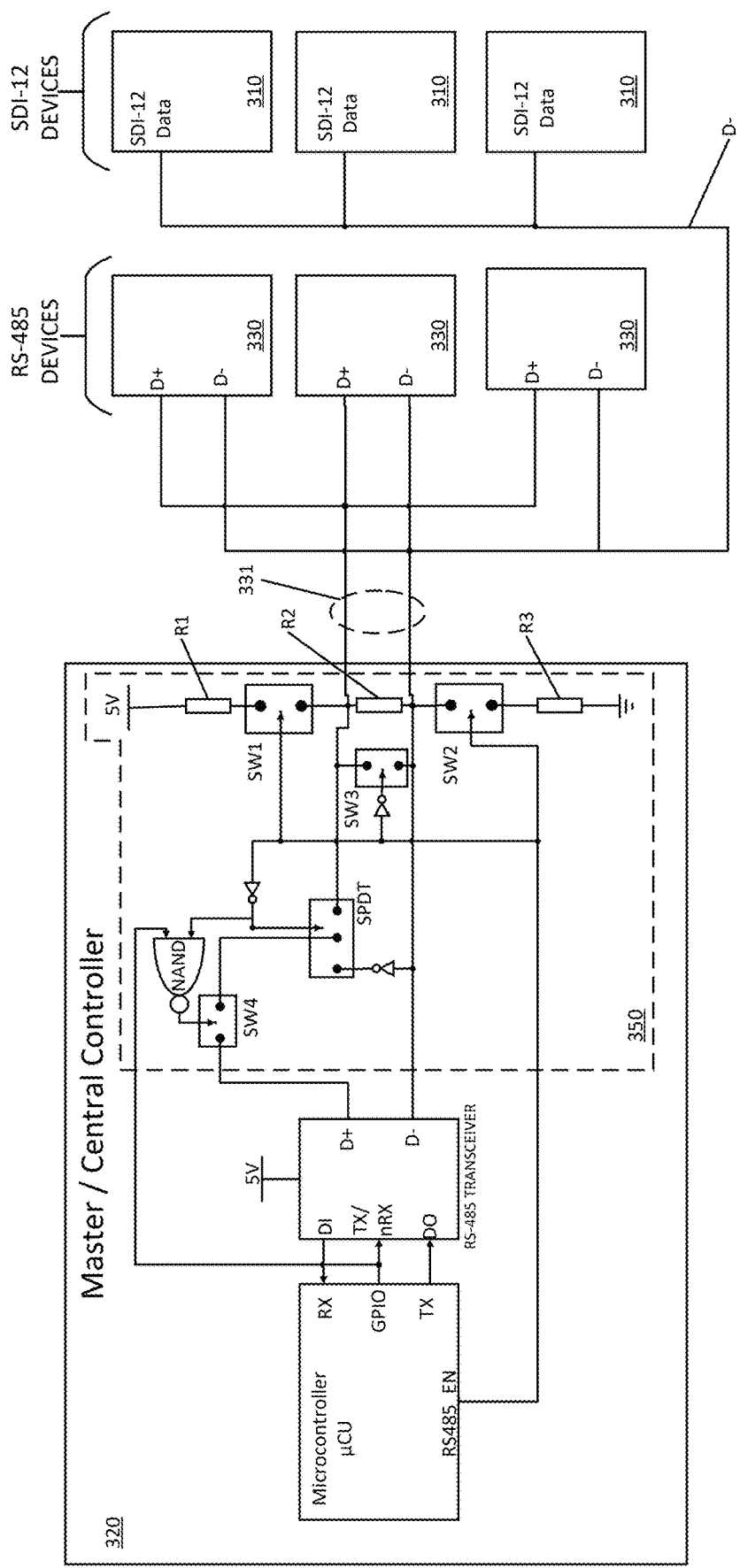
FIG. 3 shows an interface circuit according to an embodiment of the present disclosure.

FIG. 3 shows the interface circuit 350 according to an embodiment of the present disclosure. Essentially, the operation of the interface circuit 350 is as follows: In RS-485 mode, the interface circuit 350 passes the differential signals D+, D− between the RS-485 transceiver and the bus 331 unaffected. In SDI-12 mode, whether transmitting or receiving and only the D− conductor of the bus 331 is driven, the interface circuit 330 disconnects the D+ terminal of the RS-485 transceiver from the D+ conductor of the bus 331 and ties the D+ conductor of the bus 331 to the D− conductor of the bus 331. Thus in SDI-12 mode there will be no differential signal driven on the bus 331 because D− and D+ will always be at the same potential.

An additional and innovative feature of the interface circuit 350 is that in SDI-12 receive mode when the central controller 320 is receiving data transmitted by an SDI-12 field device via the D− conductor of the bus 331, the interface circuit 350 passes the D− signal from the bus 331 through an inverter to the D+ terminal of the RS-485 transceiver. By inverting the D− signal and passing this inverted signal to the D+ terminal, a differential signal is thus created from the D− signal and presented to the RS-485 transceiver.

Examining the details of the interface circuit 350 as shown in FIG. 3 show how this operation of the interface circuit 350 may be implemented. As shown on the right side of the interface circuit 350 in FIG. 3, the interface circuit 350 may include three single-pole, single-throw (SPST) switches SW2, SW3, SW4. The SPST switches SW2 and SW4 may be directly switched by the RS485_EN signal: an asserted RS485_EN signal closes SW2 and SW4. The SPST switch SW3 may be controlled by an inverted RS485_EN signal: an asserted RS485_EN signal opens SW3. Therefore in RS-485 mode when RS485_EN may be asserted, SW2 may be closed and connect the D+ conductor of the bus 331 to VCC via resistor R1; SW4 may be closed and connect the D− conductor of the bus 331 to GND via resistor R3; and SW3 may remain open.

In SDI-12 mode, the RS485_EN signal may be un-asserted. The SPST switches SW2 and SW4 may therefore be opened, disconnecting the D+, D− conductors of the bus 331 from VCC and GND, respectively. However, SW3 may be closed by the un-asserted (and inverted) RS485_EN, thus tying together the D+ and D− conductors of the bus 331. The closing of SW3 may therefore put the D+ and D− conductors of the bus 331 at the same potential.

The interface circuit 350 may further include a fourth SPST switch SW5 and a single-pole, double-throw switch (SPDT) SW1. These two switches are used in conjunction as follows: In RS-485 mode, regardless of transmitting or receiving, these switches SW5, SW1 may connect the D+ conductor of the bus 331 with the D+ terminal of the RS-485 transceiver. In SDI-12 transmit mode (i.e., the central controller 320 is transmitting), SW5 may be opened and disconnect the D+ terminal of the RS485 transceiver from everything. In SDI-12 receive mode, SW5 may be closed, and SW1 may be switched to conduct the inverted D− signal of the bus 331 to the D+ terminal of the RS-485 receiver.

The switching of SPDT switch SW1 may be controlled directly or indirectly (i.e., via an inverter) by the RS485_EN signal. In the embodiment as shown in FIG. 3, SW1 is controller by the inverted RS485_EN signal.

The switching of SPST switch SW5 is a little more complicated and must be controlled by a logical combination of the RS485_EN signal and the TX/nRX enable signal from the microcontroller μCU. In the embodiment as shown in FIG. 3, SW5 is controlled by a NAND gate, however, other logic gates may be used to implement the same switching logic.

What is claimed is:

1. A serial communication interface circuit, comprising:
a first D+ terminal and a first D− terminal forming a first differential signal input/output (I/O);
a second D+ terminal and a second D− terminal forming a second differential signal I/O;
an input voltage (VCC) terminal and a ground (GND) terminal;
a differential mode enable input;
a transmit enable input;
a first single-pole, single-throw (SPST) switch and a pull-up resistor, wherein the first SPST switch is configured to connect the second D+ terminal to the VCC terminal via the pull-up resistor when the first SPST switch is closed;
a second SPST switch and a pull-down resistor, wherein the second SPST switch is configured to connect the second D− terminal to the GND terminal via the pull-down resistor when the second SPST switch is closed;
a termination resistor configured to connect the second D+ terminal to the second D− terminal via the termination resistor;
a third SPST switch connected in parallel with the termination resistor and configured to connect the second D+ terminal to the second D− terminal when the third SPST switch is closed;
a fourth SPST switch configured to internally disconnect the first D+ terminal when the fourth SPST switch is open;
a first inverter configured to invert a D− signal of the second D− terminal;
a single-pole, double-throw (SPDT) switch configured to connect the first D+ terminal from the fourth SPST switch to either the second D+ terminal or to the inverted D− signal from the first inverter; and
switch control logic configured to control the first, second, third, and fourth SPST switches and additionally the SPDT switch.

2. The serial communication interface circuit of claim 1, wherein the switch control logic is configured to close the first, second, and fourth SPST switches and open the third SPST switch when the differential mode enable input is asserted,
wherein the switch control logic is further configured to switch the SPDT switch to connect the first D+ terminal from the closed fourth SPST switch to the second D+ terminal when the differential mode enable input is asserted,
wherein the switch control logic is further configured to open the first and second SPST switches and close the third SPST switch when the differential mode enable input is un-asserted,
wherein the switch control logic is further configured to open the fourth SPST switch when the when the differential mode enable input is un-asserted and the transmit enable input is asserted and to close the fourth SPST switch when the differential mode enable input is un-asserted and the transmit enable input is un-asserted, and
wherein the switch control logic is further configured to switch the SPDT switch to connect an output of the first inverter to the fourth SPST switch when the when the differential mode enable input is un-asserted, whereby the inverted D− signal is provided to the first D+ terminal via the SPDT switch and the fourth SPST switch when the differential mode enable input is un-asserted and the transmit enable input is un-asserted.

3. The serial communication interface circuit of claim 2, wherein the switch control logic includes:
a second inverter configured to provide an inverted differential mode enable input to a control input of the third SPST switch;
a third inverter configured to provide the inverted differential mode enable input to a control input of the SPDT switch; and
a NAND gate configured to NAND the inverted differential mode enable input with the transmit enable input and to provide a NAND result to a control input of the fourth SPST switch.

4. A data acquisition unit, comprising:
a microcontroller including a receive data (RX) input, and transmit data (TX) output, a TX/nRX enable output, and a differential mode enable output;
a differential transceiver including a received data output connected with the RX input of the microcontroller; a transmit data input connected with the TX output of the microcontroller;
TX/nRX enable input connected with the TX/nRX enable output of the microcontroller; and a differential signal input/output (I/O) including a D+ terminal and a D− terminal; and
a serial communication interface circuit, including:
a first D+ terminal and a first D− terminal forming a first differential signal input/output (I/O);

a second D+ terminal and a second D− terminal forming a second differential signal I/O;
an input voltage (VCC) terminal and a ground (GND) terminal;
a differential mode enable input;
a transmit enable input;
a first single-pole, single-throw (SPST) switch and a pull-up resistor, wherein the first SPST switch is configured to connect the second D+ terminal to the VCC terminal via the pull-up resistor when the first SPST switch is closed;
a second SPST switch and a pull-down resistor, wherein the second SPST switch is configured to connect the second D− terminal to the GND terminal via the pull-down resistor when the second SPST switch is closed;
a termination resistor configured to connect the second D+ terminal to the second D− terminal via the termination resistor;
a third SPST switch connected in parallel with the termination resistor and configured to connect the second D+ terminal to the second D− terminal when the third SPST switch is closed;
a fourth SPST switch configured to internally disconnect the first D+ terminal when the fourth SPST switch is open;
a first inverter configured to invert a D− signal of the second D− terminal;
a single-pole, double-throw (SPDT) switch configured to connect the first D+ terminal from the fourth SPST switch to either the second D+ terminal or to the inverted D− signal from the first inverter; and
switch control logic configured to control the first, second, third, and fourth SPST switches and additionally the SPDT switch,
wherein:
the first D+ terminal of the serial communication interface circuit is connected with the D+ terminal of the differential transceiver;
the first D− terminal of the serial communication interface circuit is connected with the D− terminal of the differential transceiver;
the differential mode enable input of the serial communication interface circuit is connected with the differential mode enable output of the microcontroller; and
the transmit enable input of the serial communication interface circuit is connected with the TX/nRX enable output of the microcontroller.

5. The data acquisition unit of claim 4,
wherein the switch control logic is configured to close the first, second, and fourth SPST switches and open the third SPST switch when the differential mode enable input is asserted,
wherein the switch control logic is further configured to switch the SPDT switch to connect the first D+ terminal from the closed fourth SPST switch to the second D+ terminal when the differential mode enable input is asserted,
wherein the switch control logic is further configured to open the first and second SPST switches and close the third SPST switch when the differential mode enable input is un-asserted,
wherein the switch control logic is further configured to open the fourth SPST switch when the when the differential mode enable input is un-asserted and the transmit enable input is asserted and to close the fourth SPST switch when the differential mode enable input is un-asserted and the transmit enable input is un-asserted, and
wherein the switch control logic is further configured to switch the SPDT switch to connect an output of the first inverter to the fourth SPST switch when the when the differential mode enable input is un-asserted, whereby the inverted D− signal is provided to the first D+ terminal via the SPDT switch and the fourth SPST switch when the differential mode enable input is un-asserted and the transmit enable input is un-asserted.

6. The data acquisition unit of claim 5,
wherein the microcontroller is configured to transmit differential data via the differential transceiver by asserting the differential mode enable output, by asserting the TX/nRX enable output, and by sending the differential data via the TX output,
wherein the microcontroller is configured to receive the differential data via the differential transceiver by asserting the differential mode enable output, by un-asserting the TX/nRX enable output, and by receiving the differential data via the RX input,
wherein the microcontroller is configured to send non-differential serial data via the differential transceiver by un-asserting the differential mode enable output, by asserting the TX/nRX enable output, and by sending the non-differential serial data via the TX output, and
wherein the microcontroller is configured to receive the non-differential serial data via the differential transceiver by un-asserting the differential mode enable output, by un-asserting the TX/nRX enable output, and by receiving the non-differential serial data via the RX input.

7. A field device network, comprising:
a data acquisition unit, including:
a microcontroller including a receive data (RX) input, and transmit data (TX) output, a TX/nRX enable output, and a differential mode enable output;
a differential transceiver including a received data output connected with the RX input of the microcontroller; a transmit data input connected with the TX output of the microcontroller; TX/nRX enable input connected with the TX/nRX enable output of the microcontroller; and a differential signal input/output (I/O) including a D+ terminal and a D− terminal; and
a serial communication interface circuit, including:
a first D+ terminal and a first D− terminal forming a first differential signal input/output (I/O);
a second D+ terminal and a second D− terminal forming a second differential signal I/O;
an input voltage (VCC) terminal and a ground (GND) terminal;
a differential mode enable input;
a transmit enable input;
a first single-pole, single-throw (SPST) switch and a pull-up resistor, wherein the first SPST switch is configured to connect the second D+ terminal to the VCC terminal via the pull-up resistor when the first SPST switch is closed;
a second SPST switch and a pull-down resistor, wherein the second SPST switch is configured to connect the second D− terminal to the GND terminal via the pull-down resistor when the second SPST switch is closed;

a termination resistor configured to connect the second D+ terminal to the second D− terminal via the termination resistor;

a third SPST switch connected in parallel with the termination resistor and configured to connect the second D+ terminal to the second D− terminal when the third SPST switch is closed;

a fourth SPST switch configured to internally disconnect the first D+ terminal when the fourth SPST switch is open;

a first inverter configured to invert a D− signal of the second D− terminal;

a single-pole, double-throw (SPDT) switch configured to connect the first D+ terminal from the fourth SPST switch to either the second D+ terminal or to the inverted D− signal from the first inverter; and switch control logic configured to control the first, second, third, and fourth SPST switches and additionally the SPDT switch, wherein:
the first D+ terminal of the serial communication interface circuit is connected with the D+ terminal of the differential transceiver;

the first D− terminal of the serial communication interface circuit is connected with the D− terminal of the differential transceiver;

the differential mode enable input of the serial communication interface circuit is connected with the differential mode enable output of the microcontroller; and the transmit enable input of the serial communication interface circuit is connected with the TX/nRX enable output of the microcontroller;

a bus having a voltage supply (VCC) conductor, a ground (GND) conductor, a D+ conductor, and a D− conductor;

a first field device having a differential I/O having an D+ terminal connected with the D+ conductor bus and a D− terminal connected with the D− conductor of the bus; and a second field device having a non-differential serial I/O, wherein the non-differential serial I/O is connected with the D− conductor of the bus.

8. The field device network of claim 7, wherein the microcontroller is configured to transmit differential data to the first field device via the differential transceiver by asserting the differential mode enable output, by asserting the TX/nRX enable output, and by sending the differential data via the TX output, wherein the microcontroller is configured to receive the differential data from the first field device via the differential transceiver by asserting the differential mode enable output, by un-asserting the TX/nRX enable output, and by receiving the differential data via the RX input, wherein the microcontroller is configured to send non-differential serial data to the second field device via the differential transceiver by un-asserting the differential mode enable output, by asserting the TX/nRX enable output, and by sending the non-differential serial data via the TX output, and wherein the microcontroller is configured to receive the non-differential serial data from the second field via the differential transceiver by un-asserting the differential mode enable output, by un-asserting the TX/nRX enable output, and by receiving the non-differential serial data via the RX input.

\* \* \* \* \*